United States Patent [19]

Matsuda et al.

[11] 4,216,477

[45] Aug. 5, 1980

[54] NOZZLE HEAD OF AN INK-JET PRINTING APPARATUS WITH BUILT-IN FLUID DIODES

[75] Inventors: Yasumasa Matsuda; Satoshi Shimada; Kanji Kawakami; Motohisa Nishihara; Taisaku Kohzuma; Syoji Sagae; Tetsuo Doi; Takahiro Yamada, all of Ibaraki, Japan

[73] Assignee: Hitachi, Ltd., Tokyo, Japan

[21] Appl. No.: 35,235

[22] Filed: May 2, 1979

[30] Foreign Application Priority Data

| | | | |
|---|---|---|---|
| May 10, 1978 | [JP] | Japan | 53-54444 |
| May 13, 1978 | [JP] | Japan | 53-56149 |
| May 18, 1978 | [JP] | Japan | 53-58276 |

[51] Int. Cl.[2] .................... G01D 15/18

[52] U.S. Cl. .................... 346/140 R

[58] Field of Search .................... 346/140 R

[56] References Cited

U.S. PATENT DOCUMENTS

| | | | |
|---|---|---|---|
| 2,512,743 | 6/1950 | Hansell | 346/140 R |
| 3,152,858 | 10/1964 | Wadey | 346/140 R UX |
| 3,397,278 | 8/1968 | Pomerantz . | |
| 3,848,118 | 11/1974 | Rittberg | 346/140 R X |
| 3,852,773 | 12/1974 | Sicking et al. | 346/140 R |
| 3,946,398 | 3/1976 | Kyser et al. | 346/140 R X |
| 4,015,271 | 3/1977 | Sultan | 346/140 R |
| 4,074,284 | 2/1978 | Dexter et al. | 346/140 R |

FOREIGN PATENT DOCUMENTS

| | | | |
|---|---|---|---|
| 1012198 | 6/1977 | Canada | 346/140 R |
| 2448341 | 4/1976 | Fed. Rep. of Germany | 346/140 R |

*Primary Examiner*—George H. Miller, Jr.
*Attorney, Agent, or Firm*—Craig & Antonelli

[57] ABSTRACT

A nozzle head of an ink-jet printing apparatus according to the present invention comprises an ink reservoir for storing the ink supplied from an ink tank, a pump chamber provided between said ink reservoir and a nozzle for injecting ink particles, and a fluid diode provided between said ink reservoir and said pump chamber, which are all formed in a same substrate, wherein said pump chamber is caused to change its volume responsive to electric signals so that the ink stored therein is injected from said nozzle, and the ink is prevented from reversely flowing from said pump chamber to said ink reservoir when the volume of the pump chamber is changed, thereby to improve the frequency response of ink particles injected from the nozzle.

14 Claims, 20 Drawing Figures

NOZZLE HEAD OF AN INK-JET PRINTING APPARATUS WITH BUILT-IN FLUID DIODES

BACKGROUND OF THE INVENTION

1. Field of the Invention

The present invention relates to an ink-jet printing apparatus, and particularly relates to a nozzle head of an ink-jet printing apparatus of the type in which the volume in the pump chamber is suddenly changed responsive to electric signals such that ink particles are generated from the nozzle at a period corresponding to the electric signals.

2. Prior Art

A variety types of non-impact printing devices have already been proposed to make records such as characters on a recording medium such as recording paper by injecting small ink particles from a nozzle head.

According to the earlier ink-jet printers used for the apparatus of this type, the ink compressed by a compressor pump is injected from nozzles while being imparted with ultrasonic vibrations thereby to generate a beam (or a stream) of ink particles.

The ink particles continuously injected from the nozzles are electrically charged responsive to record-information signals, allowed to pass through an electrostatic field, deflected depending upon the amounts of electric charge possessed by the ink particles, and are permitted to reach predetermined positions on a recording paper.

On the other hand, the ink particles which are not used for effecting the recording are not electrically charged responsive to the recording signals. Hence, such ink particles are not deflected but are allowed to travel straight even after having passed through the electrostatic field, and are recovered by means of a gutter.

According to the abovementioned device, among the ink particles injected from the nozzles, the ink particles which do not participate in the recording amounts to as great as 3 to 10 times the amount of the ink adhered on the recording paper to effect the recording. Therefore, the ink particles which does not participate in the recording are recovered by means of the gutter as mentioned above, and are reused.

When the ink particles are recovered and reused, however, the quality of ink particles is often changed while they fly through the air, or dust and dirt are mixed into the ink, causing the nozzles to be clogged and making it difficult to maintain the reliability of the apparatus, unless any suitable devices are provided to prevent such defects.

In recent years, however, attention has been given to an inj-jet printer of the type of on-demand which produces ink particles from the nozzles only when the ink particles are needed.

For instance, U.S. Pat. No. 3,946,398 discloses an ink-jet printer of the type in which the ink in an ink tank is supplied to a nozzles head through a pipe, a pump chamber in the nozzle head is excited by means of an electrostrictive element, and the ink particles are injected from an orifice of the nozzle responsive to electric signals applied to the electrostrictive element such that the ink is adhered onto a recording paper.

According to the nozzle head of the type mentioned above, therefore, the ink is injected only at the time of effecting the recording by controlling the pulse voltage applied to the electrostrictive element, making it possible to improve such problems as the degradation of ink or the recovery of the unused ink. Besides, the ink can be introduced into a pump chamber from an ink reservoir during the step in which the wall of the pump chamber deformed by the electrostrictive element restores its shape, enabling the device to be constructed in a small size.

Further, by suitably determining the shape of nozzle holes of the nozzle head, the ink particles can be caused to fly in a predetermined direction. Accordingly, by arraying a plurality of such nozzles, a desired recording can be effected without the need of deflecting the ink particles way of electrostatic field.

The nozzle head employed by the above ink-jet printer is usually composed of a base plate, a covering plate and an electrostrictive element mounted on a position opposed to the pump chamber on the covering plate. Grooves of predetermined shapes will have been formed in the base plate. By placing the covering plate on the base plate, the ink reservoir, the pump chamber and the nozzle holes are formed as a unitary structure.

To attain good recording using such an apparatus, however, the diameter of ink particles must be selected to be about 100 μm. For this purpose, the nozzle holes must have a size as small as about 50 to 100 μm requiring very high degree of dimensional precision.

With the earlier apparatus in which the base plate and covering plate are stuck by means of an organic adhesive agent or soldering, however, the adhesive agent often entered into the nozzle holes causing the cross-sectional areas of the nozzle holes to be varied or resulting in the clogging of nozzle holes. Furthermore, it was very difficult to from orifices of a plurality of nozzles maintaining uniform cross-sectional area.

Further, through the study by the inventors of the present invention, it was revealed that the shape of the nozzles must be finished maintaining very high precision because of the reasons mentioned below.

(1) In general, the compressed progressive wave in ink in a capillary tube is easily affected by the stickiness of the ink with respect to the tubular wall. Once eddy currents are created on the tubular wall, sticky current is peeled off, and the ink flows in a zig-zag manner in the tube. Therefore, the ink particles do not fly constantly. Therefore, the wall surface in the nozzle through which the ink flows must be very smooth.

(2) The viscous flow of ink flowing through the tubular wall becomes unstable under a particular condition determined by a relation between the progressive speed of the compressed progressive wave and the cross-sectional area of the flow path of the nozzle. Particularly, when the cross-sectional area of the flow path is not constant in a direction in which the ink flows, a flow tends to develop along a portion of the inner wall of the nozzle making it difficult to fly the ink in a predetermined direction. Therefore, the flow path of the nozzle must have a constant cross-sectional area and must be straight.

(3) The ink particles are injected from the tip of the nozzle overcoming the surface tension of ink at the tip of the nozzle. Therefore, the size of the ink particles are greatly varied depending upon the cross-sectional area at the tip of the nozzle. Hence, the deviation of cross-sectional areas at the tips of each of the nozzles must be reduced as small as possible so that the area of each dot recorded by the ink particles is confined within a predetermined range.

(4) The compressed progressive wave generated in the ink in the compressing chamber by the electrostrictive vibrator propagates toward the side of the nozzles and toward the side of supplying the ink. Therefore, the size of ink particles injected from the nozzle is also affected by the ratio of a fluid impedance from the compressing chamber to the tip of the nozzle to a fluid impedance from the compressing chamber to the ink reservoir. Accordingly, to reduce the deviation in size of ink particles injected from each of the nozzles, it is necessary to make constant the fluid impedances of the individual nozzles or, in other words, it is necessary to set constant the cross-sectional area and the length of the nozzles.

SUMMARY OF THE INVENTION

Object

The present invention is to solve the abovementioned defects and technical assignments inherent in the conventional art.

It is therefore a primary object of the present invention to provide a nozzle head which features a high response frequency of ink particles injected from the nozzle holes and which efficiently generates ink particles responsive to the drive pulses, as a result of a fluid diode interposed between the ink reservoir and the pump chamber.

Another object of the present invention is to provide a nozzle head with ink paths having high demensional precision, composed of a base plate having grooves for nozzles and a covering plate, which are joined together as a unitary structure by way of static electricity without using adhesive agent.

A further object of the present invention is to provide a nozzle head in which the inner walls are formed highly smoothly and linearly and in which the cross-sectional areas are maintained constant in the lengthwise direction, by forming grooves in the base plate in a portion of a single crystal which will be etched at different etching rates depending upon the crystalline surfaces of a semiconductive material, and by constituting at least two inner wall surfaces of the nozzle groove by way of crystalline surfaces having the slowest etching rate.

SUMMARY

In order to achieve the abovementioned objects, the principal feature of the present invention resides in an ink-jet printer having high printing precision and good frequency response, employing a nozzle head comprising an ink reservoir, a pump chamber having a nozzle hole at one end, a fluid diode provided between the ink reservoir and the pump chamber, a base plate having grooves which form ink paths by connecting them, a covering plate joined to the base plate, and an electromechanical converter element mounted on a position opposed to the pump chamber of the base plate, wherein the ink is prevented from reversely flowing from the pump chamber to the ink reservoir when electric pulse signals are applied to the electromechanical converter element, and the fluid impedance is reduced when the ink is supplied from the ink reservoir to the pump chamber.

DESCRIPTION OF THE PREFERRED EMBODIMENTS

The invention is mentioned below with reference to embodiments in conjunction with the drawings.

Figure 1:
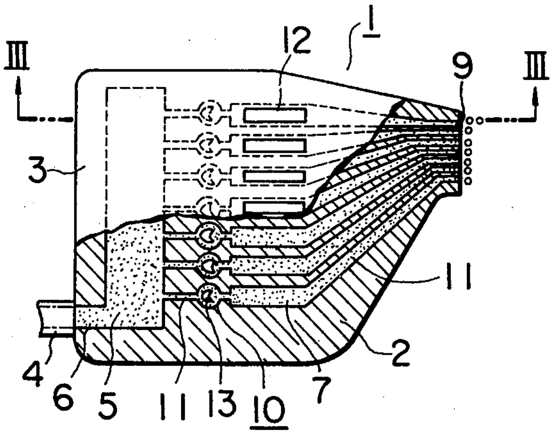
FIG. 1 is a plan view of a nozzle head according to an embodiment of the present invention.
Figure 2:
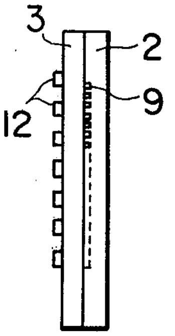
FIG. 2 is a view showing the right side of the nozzle head.
Figure 3:
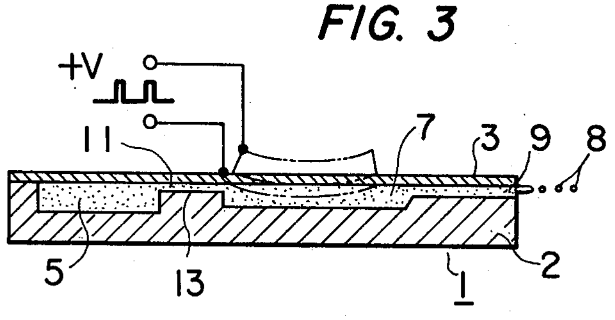
FIG. 3 is a cross-sectional view along a line III—III of FIG. 1.

Referring to FIG. 1 to FIG. 3, a nozzle head 1 consists of a base plate 2 and a covering plate 3.

In the base plate 2 have been formed an ink-supply path 6 for supplying ink from an ink tank (not shown) to an ink reservoir 5 through a supply pipe 4, pump chambers 7, nozzle holes 9 for injecting ink particles 8, fluid diodes 10 located between the pump chambers 7 and the ink reservoirs 5 to prevent the reversal of ink flow, and flow paths 11 for communicating them.

Onto the base plate 2 has been joined the covering plate 3, and electrostrictive elements 12 have been mounted on the upper surface of the covering plate 3 at positions corresponding to the pump chambers 7.

Hence, the ink supplied into the ink reservoir 5 via the supply pipe 4 is introduced into the pump chambers 7 via fluid diodes 10 and are filled therein.

When a pulse-like voltage +V as shown in FIG. 3 is applied to the electrostrictive elements 12, the individual electrostrictive elements 12 to which is applied the pulse-like voltage undergo deformation. The deformation is then transmitted to a portion of the covering plate 3 thereby to apply impulse-like pressure to the ink in the corresponding pump chambers 7.

A compressed progressive wave is then generated in the ink in the pump chamber 7, and half of the compressed progressive wave heading in one direction is interrupted by the impedance of the fluid diode 10 and another half of the wave heading toward the other direction works to inject the ink in the form of particles 8 through the nozzle hole 9.

If the ink particles 8 are allowed to be adhered onto a recording paper (not shown), it is possible to obtain recording responsive to electric signals.

Here, the fluid diode 10 provided between the ink reservoir 5 and the pump chamber 7 is a so-called capsular-type purely fluid diode 10*a* with no moving part. As best shown in FIG. 4, the capsular-type purely fluid diode 10*a* consists of a barrier wall 13 of the shape of heart accommodated in the flow path 11 of the shape of spade.

Figure 4A:
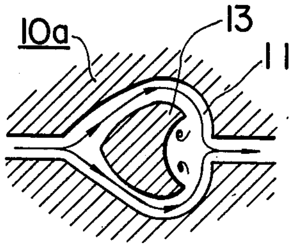
FIGS. 4A and 4B are views schematically showing the setup of a fluid diode employed by the present invention.
Figure 4B:
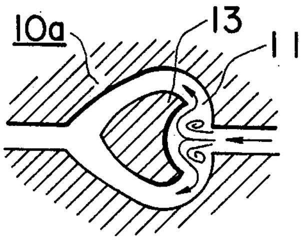

FIG. 4*a* shows the case when the ink is flowing in the forward direction of the capsular-type purely fluid diode 10*a*, and FIG. 4*b* shows the case when the ink is flowing in the reverse direction.

The capsular-type purely fluid diode 10*a* does not give so much great impedance ratio of forward direction to reverse direction when the fluid is flowing steadily, but gives a great impedance ratio for the transient flow of liquid. The capsular-type purely fluid diode, however, was seldom used so far because it could not find any suitable applications.

The inventors of the present invention have conducted various experiments by forming the capsular-type purely fluid diode 10*a* in the flow path 11 of the nozzle head 1 as shown in FIG. 1, and found that such a setup gives very good diode effect for the nozzle head 1, enabling the response frequency to be heightened to about 10 KHz without at all developing mutual interference among the nozzles, and further enabling the voltage of the drive pulses (+V of FIG. 3) applied to the electrostrictive elements 12 to be lowered as compared with the voltages customarily employed, yet maintaining improved efficiency.

Besides, since the capsular-type purely fluid diode is flatly constructed as mentioned above, it can be formed in the base plate 2 simultaneously with the formation of the pump chambers, ink reservoir 5 and flow paths 11, without increasing the manufacturing cost.

Figure 5:
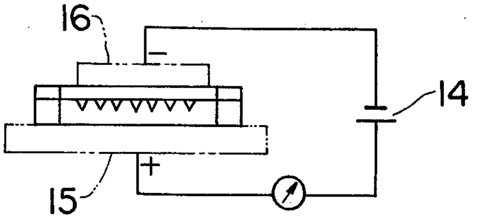
FIG. 5 is a front view showing a method of producing the nozzle head according to the embodiment of the present invention.

The nozzle head formed as mentioned above and a method of its production are mentioned below with reference to FIG. 5.

According to this embodiment, the base plate 2 is made of silicon, the covering plate 3 is made of a borosilicate glass which can be electrostatically joined thereto, and the two are electrostatically joined together as a unitary structure without using adhesive agent.

To produce such a nozzle head 1, grooves are formed highly precisely in the base plate 2 made of silicon by the photoetching technique, and the junction surfaces of the base plate 2 and the covering plate 3 made of borosilicate glass are well flattened and finished to a surface coarseness of about 0.1 μm.

Then, the two are superposed togehter, placed between electrodes 15 and 16, and are heated until the temperature of the whole members reaches about 400° C. Thereafter, a voltage of about 1000 volts is applied across the two electrodes 15 and 16 from a d-c power supply 14, in such a manner that a positive potential is applied to the electrode 15 on the side of the base plate 2 and a negative potential is applied to the electrode 16 on the side of the covering plate 3.

Most of the current flows into the electrodes 15 and 16 during the initial stage, and the flow of current is reduced after several minutes have passed to complete the electrostatic junction.

Observation of the junction portions of the two members by means of a microscope revealed that there was present no foreign matter. Further, the two members were joined togehter so strongly that part of them was broken when they were pulled apart.

Thus, after the electrostatic junction is completed, the electrostrictive elements are adhered onto the surface of the covering plate 3 at positions opposed to the pump chambers 7 thereby to assemble the nozzle head 1.

Below is mentioned an embodiment of forming flow paths 11 in the base plate 2 in conjunction with FIG. 6.

Figure 6:
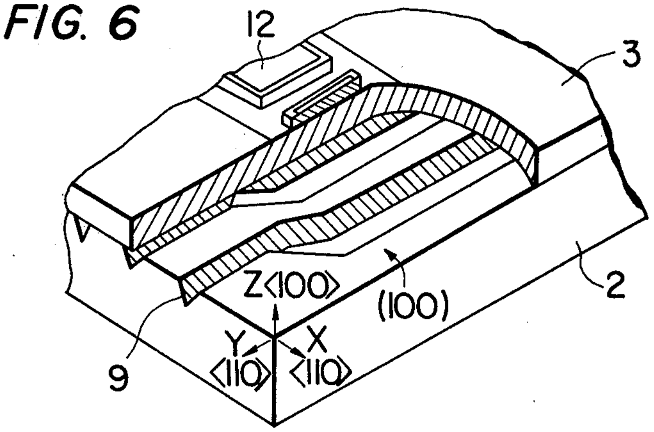
FIG. 6 is a perspective view showing a major portion of a base plate of the nozzle head.

A single crystal of silicon forming the base plate 2 is so selected as to acquire such axes <110> that an X axis and a Y axis meet at right angles as shown in FIG. 6, and is further so selected that the surfaces of X–Y axis (upper and lower surfaces) become planes (100) of the single crystal.

By so doing, the plane (111) of the single crystal is in parallel with the Y axis and meets the surface of X–Y axis at an angle of about 54 degrees. The two walls of the V-shaped grooves forming the nozzle holes 9 in the base plate 2 are constituted by the planes (111).

The plane (111) will be etched very slowly by an alkali solution such as of sodium hydroxide, potassium hydroxide or hydrazine, as compared with other crystalline surfaces. Therefore, by etching the plane (100) using an alkali solution, it is possible to obtain a V-shaped groove defined by the planes (111).

The width between the upper edges of the V-shaped groove is determined by the gap of a photoresist at the time of photoetching, and can be selected very precisely.

Further, the depth of the V-shaped groove is determined by the angle (about 54 degrees) subtended by the plane (100) and the plane (111) and by the width at the upper edges. The depth therefore can be determined very precisely. The plane (111) formed by the etching is very smooth and linear.

To trim the length of the nozzle holes 9 of each of the nozzles, the X–Z plane at the tip of the nozzles should be cut by a dicing device which is used for cutting ordinary semiconductor elements. Using this cutting device, the desired portions can be cut to an accuracy of about ±0.01 to ±0.03 mm, making it possible to minimize the deviation in lengths of the nozzle holes 9.

According to this embodiment as mentioned above, the V-shaped grooves of nozzle holes of the nozzles formed in the base plate 2 are constituted by the two planes (111) which are formed by way of etching. Therefore, the precision for forming the nozzles is strikingly increased as compared with those formed by conventional cutting methods or etching methods without based on the crystalline azimuth, thereby making it possible to achieve the desired objects contemplated by the present invention.

Figure 7:
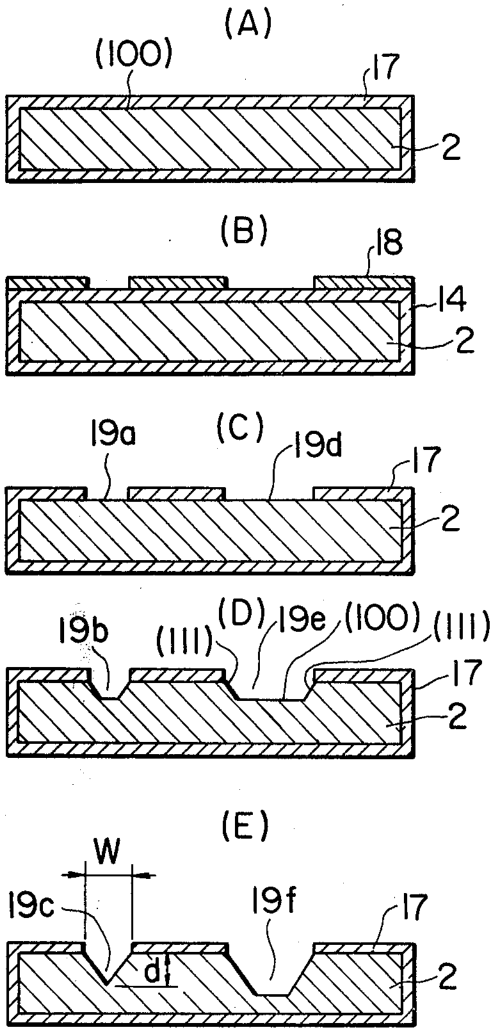
FIGS. 7A to 7E are cross-sectional views showing steps for producing the base plate of nozzle head according to the present invention.

The method of forming the V-shaped grooves in the base plate 2 is mentioned below in detail in conjunction with FIG. 7.

First, the base plate 2 composed of a single crystal of silicon having the crystalline azimuth as mentioned above is prepared. In FIG. 7, the direction perpendicular to the surface of the paper is the axis <110>, and the upper and lower surfaces of the base plate 2 are planes (100).

The base plate 2 is placed, for example, in a water vapor atmosphere heated at about 800° to 1200° C. to form a film 17 of an oxide on the surfaces thereof (FIG. 7A). In this case, the thickness of the oxide film 17 needs be about 0.3% of the depth of etching.

Then, a commonly known photoresist 18 is coated on the whole upper surface of the oxide film 17. The light is then radiated through a photographic dry plate to effect developing, thereby to obtain a pattern of photoresist 18 (FIG. 7B).

The oxide film 17 exposed through the pattern of photoresist 18 is then removed by using a solution of hydrofluoric acid or the like, so that the silicon is exposed at portions 16*a* and 16*d*. The photoresist 18 is then removed away (FIG. 7C). The base plate 2 is then subjected to the etching in a solution of, for example, potassium hydroxide of a concentration of 5 to 40% maintained at 80° C. The exposed portions 19*a* and 19*d* will then be etched. Here, however, since the rate of etching on the plane (111) is about 0.3 to 0.4% of the etching rate on the plane (100), there appear the planes (111) starting from the edge portions of the exposed portions 19*a* and 19*d* at an angle of $\tan^{-1}\sqrt{2}$ (about 54 degrees) with respect to the upper surface (plane (100) as mentioned earlier) of the base plate 2. After all, the grooves 19*b* and 19*e* formed by the etching acquire a trapezoidal shape (FIG. 7D).

As the etching is further continued, the groove 19*b* having a narrow width becomes a V-shaped groove 19*c* defined by the two planes (111) (FIG. 7E).

Considering the precision of the V-shaped groove 19*c*, a so-called undercut portion is very small on the lower side at the edges of the oxide film 17. Therefore, when the etching is effected using potassium hydroxide having high purity, the undercut is only about 0.2% of the depth etched in the plane (100).

Therefore, the width W of the V-shaped groove 19*c* can be defined to an accuracy of about ±5 μm including errors introduced by the dry plate of photomask. The angle at the bottom of the V-shaped groove 19*c* is determined by the angle (about 72 degrees) subtended by the planes (111), and the depth d of the V-shaped groove 19*c* is $(1/\sqrt{2})W$.

Thus, the V-shaped groove 19*c* can be formed very precisely, so as to be very desirable for forming a nozzle in the base plate.

As for the trapezoidal groove 19*f* formed by the etching, the width and the angle of the inclined surfaces on both sides are determined in the same manner as the V-shaped groove 19C. Further, the depth can be determined to an accuracy of about ±2% by properly controlling the temperature of the etching solution and the etching time. The trapezoidal groove therefore can be very desirably utilized for the nozzle head.

Generally speaking, however, the V-shaped groove 19*c* is suited for flowing the liquid to the nozzle head, and the trapezoidal groove 19*f* is suited for flowing the liquid to the pump chamber 7, to the flow path 11 and to the ink reservoir 5.

Figure 8:
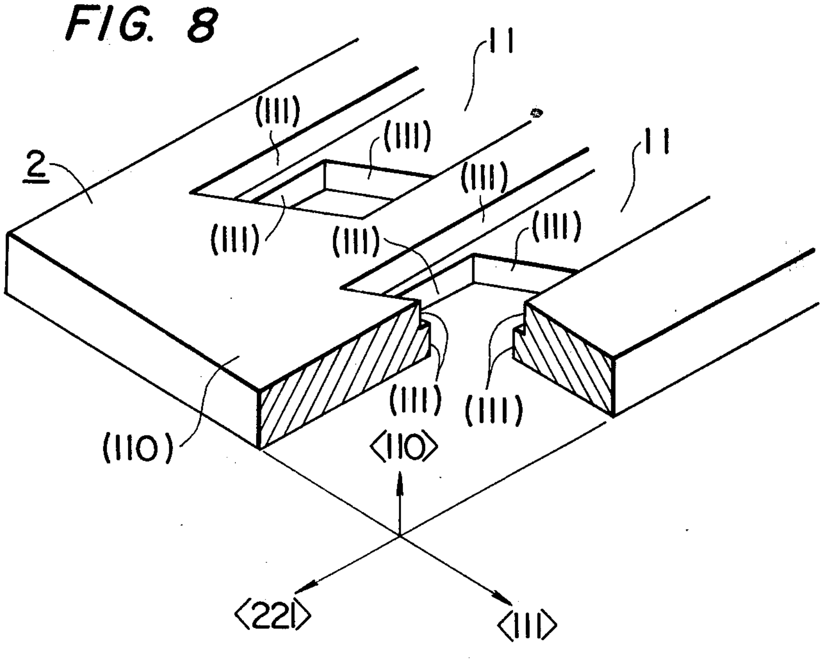
FIG. 8 is a perspective view showing an important portion of the base plate of nozzle head according to another embodiment of the present invention.

FIG. 8 shows the construction of a base plate for nozzle head according to another embodiment of the present invention. In this case, also, the base plate 2 is made of a single silicon crystal, and the planes (110) have been so selected as to serve as the upper and lower surfaces.

With such a single crystal, the two planes (111) crossing at an angle of about 72 degrees are at right angles with the upper and lower surfaces, i.e., at right angles with the planes (110).

According to this embodiment, grooves for pump chambers 7 are formed in the base plate 2, and nozzle holes 9 are formed in the bottom of the groove penetrating through the base plate 2. The grooves for pump chambers 7 and the inner walls of the nozzle holes 9 have all been constituted by the planes (111). That is, since the two planes (111) are meeting at an angle of 72 degrees as mentioned earlier, the grooves for pump chambers 7 and nozzle holes 9 of nozzles have all been formed in the shape of a parallelogram with an acute angle of 72 degrees. Here, although not diagramatized, the covering plate 3 has been joined to the base plate 2 in the same manner as the abovementioned embodiment.

Below is mentioned the method of making the abovementioned base plate 2. Since one plane (111) is in parallel with the axis <221> on the plane (111), an exposure surface of silicon of such a parallelogram that the two sides are in parallel with the axis <221> and the acute angle is about 72 degrees is provided by means of a photomask, and the etching is then performed. Then the etching proceeds perpendicularly starting from the plane (110), thereby to form a hole or a groove of a parallelogram defined by four inner walls of planes (111).

With the nozzle head made up of the abovementioned base plate, the cross-sectional areas of the nozzles can be determined maintaining high precision by way of photoetching. Since the planes (111) are utilized, the inner walls of the nozzles are highly smooth and linear. Further, the lengths of the nozzles are determined relative to the thickness of the base plate, and can be trimmed highly precisely. Moreover, if the compressing chambers are alternately formed on the right and left sides with respect to a row of nozzles, the pitch in the array of nozzles can be reduced to further heighten the density of nozzles.

Although the foregoing embodiments have dealt with the case in which a single crystal of silicon is used as the base plate, the base plate may of course be made of a single crystal of germanium having the same crystalline structure as that of the single crystal of silicon.

As mentioned above, according to the embodiments of the present invention, part or whole of the inner walls of the nozzles are constituted by crystalline surfaces of a single crystal, making it possible to obtain high-precision nozzles featuring highly linear and smooth surfaces as well as uniform cross-sectional area in the lengthwise direction. Consequently, the size of the ink particles injected from the nozzles and the flying direction can be uniformalized enabling the recording to be effected precisely.

Further, the borosilicate glass used as a covering plate which is electrostatically joined to the base plate 2 has nearly the same thermal expansion coefficient as that of the silicon constituting the base plate. Therefore, in electrostatically joining the covering plate to the silicon base plate, the distortion can be reduced even when they are subjected to high temperatures.

In the aforementioned embodiments, although the silicon was used as the base plate 2 and the borosilicate glass was used as the covering plate 3, it is of course allowable to use a semiconductive material such as silicon or germanium as the base plate 2, and a ceramic material as the covering plate 3. In addition to the abovementioned materials, many other materials can be used as the base plate and the covering plate which are to be electrostatically joined together. Preferred examples are as tabulated below.

| Base plate | Covering plate |
|---|---|
| Low-expansion alloys of the type of iron and nickel (such as Koval, Fahrnico). | Borosilicate glass. |
| Metals such as iron, copper, aluminum and the like. | Soda glass having thermal expansion coefficient close to that of the metals listed in the left. |

According to the specification of U.S. Pat. No. 3,397,278, there are many other combinations of materials that can be electrostatically joined together, such as those tabulated below.

| Combination of materials | Current density (μA/mm²) | Time (min.) | Temp. (°C.) |
|---|---|---|---|
| Silicon - quartz | 10 | 1 | 900 |
| | 4 | 4 | |
| Silicon - soft glass | 5 | 4 | 450 |
| Silicon - sapphire | 1 | 1 | 650 |
| Germanium - borosilicate glass | 3 | 2 | 450 |
| GaAs - soft glass | 25 | 3 | 450 |
| Aluminum sheet - borosilicate glass | 1 | 10 | 400 |
| Platimum foil - soft glass | 5 | 7 | 400 |
| Beryllium sheet - glass | 25 | 5 | 400 |
| Titanium sheet - glass | 25 | 5 | 400 |
| Protactimium - glass ceramics | 100 | 5 | 400 |

Combination of materials suited for the production of nozzle head are selected by taking into consideration the easiness of precision working, easiness of flatly finishing the surfaces, maximum allowable temperature, easiness of material availability and manufacturing cost.

Figure 9:
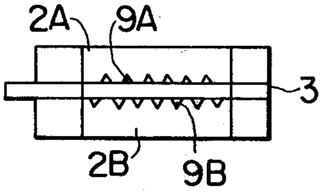
FIGS. 9 and 10 are a front view and a vertical cross-sectional view showing the nozzle head according to another embodiment of the present invention.
Figure 10:
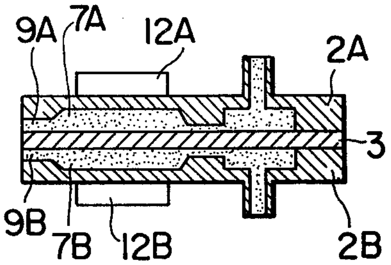

FIGS. 9 and 10 show another embodiment according to the present invention, in which a piece of covering plate 3 is sandwitched between two pieces of base plates 2A and 2B, and whole plates are electrostatically joined together.

Grooves similar to those of FIG. 1 are formed in the two base plates 2A and 2B on both sides of the covering plate 3.

By this setup, it is allowed to form nozzle holes 9A and 9B of nozzles arrayed in two rows being separated by the thickness of the covering plate 3 thereby to obtain multi-nozzles of a high density.

The electrostrictive elements 12A and 12B are adhered on the outer surfaces of the two base plates 2A, 2B at positions corresponding to pump chambers 7A and 7B. The base plates 2A, 2B, and the covering plate 3 are made of the same materials as those of the aforementioned embodiment.

Figure 11:
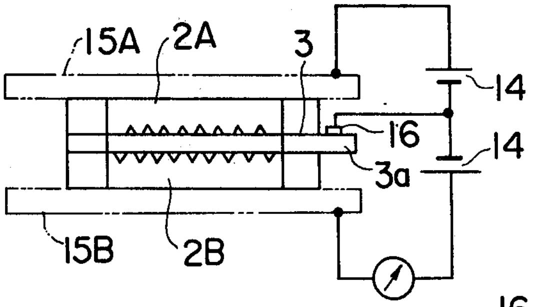
FIG. 11 is a front view showing a method of manufacturing the nozzle head.

FIG. 11 shows a method of electrostatically joining the base plates 2A, 2B, and the covering plate 3 to produce the nozzle head according to a further embodiment of the present invention. Positive electrodes 15A, 15B are brought into contact with the outer surfaces of the base plates 2A, 2B, a portion *3a* of the covering plate 3 is protruded beyond the ends of the base plates 2A, 2B, and a negative electrode 16 is brought into contact with the protruded portion *3a*. Finishing of the junction surfaces, temperature, voltage and time are the same as those of the embodiment illustrated in conjunction with FIG. 5, and their details are not mentioned here.

According to this embodiment, the electrostrictive elements 12 have been adhered onto the outer surface of the base plate 2 at positions corresponding to the pump chambers 7. Here, since the thickness of a portion of the base plate to which is adhered the electrostrictive element 12 can be reduced by way of etching and can be finished maintaining high precision, it is possible to obtain an efficient pumping function even when a reduced driving voltage is applied to the electrostrictive element.

Figure 12:
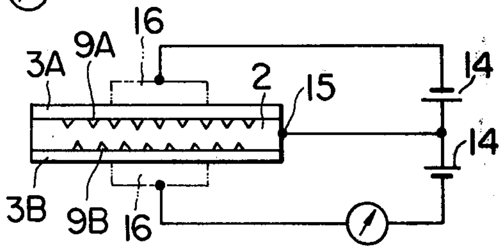
FIGS. 12 and 13 are front views showing a method of producing the nozzle head according to a further embodiment of the present invention.

FIG. 12 shows a manufacturing method according to a further embodiment of the present invention, in which a piece of base plate 2 is sandwitched between two pieces of covering plates 3A and 3B, and the whole plates are electrostatically joined together.

Grooves similar to those shown in FIG. 1 are formed in both surfaces of the base plate 2. This also makes it possible to form nozzle holes 9A, 9B in two rows. The grooves can be formed in both surfaces of the base plate 2 restraining the deviation in position to be smaller than about 10 μm by way of photoetching using a double-mask aligner. This embodiment therefore is superior to the embodiment of FIGS. 9 and 10 in regard to the precision in position of the nozzle holes 9A, 9B of upper and lower nozzles.

Figure 13:
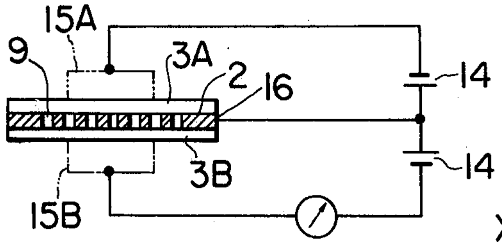

FIG. 13 shows another embodiment in which a piece of base plate 2 is sandwitched between two pieces of covering plates 3A, 3B, and the whole plates are electrostatically joined together like the embodiment of FIG. 12. According to this embodiment, however, the grooves have been so formed as to penetrate through the base plate 2, and the nozzle holes 9 of the nozzles are arrayed in a single row.

Figure 14:
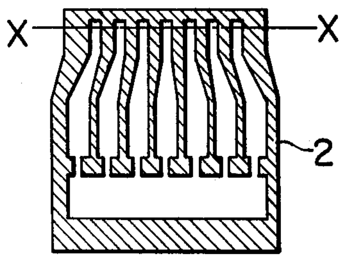
FIG. 14 is a cross-sectional view of the base plate used for producing the nozzle head of FIG. 13.

To produce the abovementioned nozzle head 1, holes of a predetermined shape are formed in the base plate 2 by way of etching as shown in FIG. 14, covering plates 3A and 3B are superposed on both surfaces of the base plate 2 and are electrostatically joined together, and thereafter, the plates are cut along a line X—X of FIG. 14.

Figure 15:
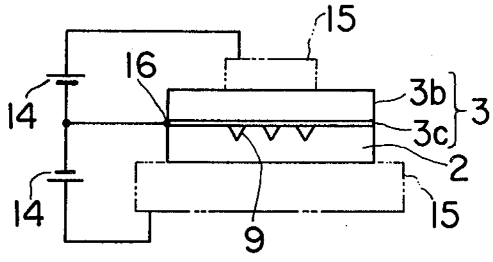
FIGS. 15 and 16 are front views of the nozzle head according to yet another embodiment of the present invention.

FIG. 15 shows a still another embodiment in which a thin junction plate *3c* is sandwitched between the base plate 2 and a main body *3b* of the covering plate made of the same material as that of the base plate 2, and the whole plates are electrostatically joined together. According to this embodiment, the covering plate 3 is composed of the main body *3b* and the junction plate *3c*. In this case, the junction plate *3c* will have been adhered onto the main body *3b* beforehand by means of vaporization or sputtering. Here, the main body *3b* needs not necessary be made of the same material as the base plate 2 but may be made of a different material.

Figure 16:
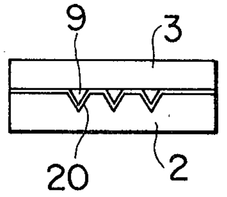

FIG. 16 shows yet another embodiment in which a corrosion-resistant protection coating 20 is formed on the portions of the base plate 2 with which will come in contact the ink. The protection coating 17 will preferably be made of $SiO_2$ and will be formed on the base plate 2 by way of sputtering or the like.

By forming the protection coating 20 on the base plate 2 made of silicon which is subject to be corroded by alkali, it is possible to prevent the base plate from being corroded by the ink which is weakly alkaline. Further, while the surface of silicon has a property to repel the ink, the protection coating of $SiO_2$ or the like gives improved wettability of ink.

The protection coating 20 may of course be provided not only on the base plate 2 but also on both the covering plate and the base plate.

As mentioned above, by forming the base plate having grooves of nozzle head and the covering plate as a unitary structure by way of electrostatic junction, it is made possible to obtain a nozzle head maintaining high dimensional precision of nozzles with reduced dispersion, without presenting such a probability that an adhesive agent is infiltrated into the grooves or orifices. Consequently, it is possible to obtain vivid printing by correctly injecting fine ink particles.

Although the foregoing embodiments have dealt with the cases in which the capsular-type purely fluid diodes are formed between the ink reservoir 5 and the pump chambers 7, it should be noted that the fluid diodes used in the invention are by no means limited thereto, but, for example, the stellar-type purely fluid diode 10*b* shown in FIG. 17 may be employed to attain the same effects as mentioned above.

Figure 17A:
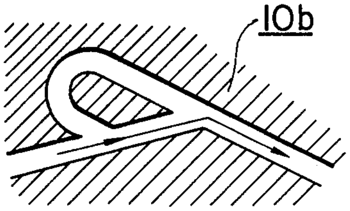
FIG. 17 is a view schematically showing a fluid diode according to a further embodiment of the present invention.
Figure 17B:
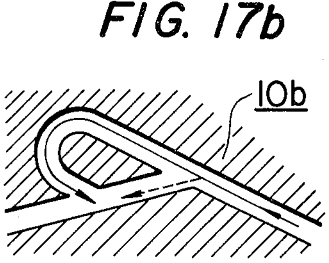

FIG. 17A shows the flow of fluid in the forward direction, and FIG. 17B shows the flow of fluid in the reverse direction.

Further, the fluid diodes 10 may be formed not only in one stage but also in a plurality of stages.

Figure 18:
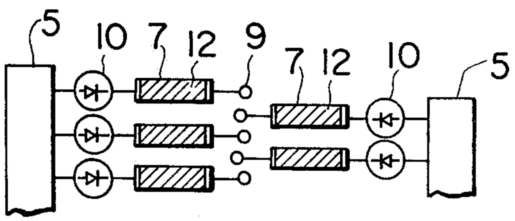
FIG. 18 is a view schematically showing the nozzle head according to yet further embodiment of the present invention.

FIG. 18 shows yet another embodiment of the present invention, in which the nozzle holes 9 of nozzles are formed at right angles to the plane which includes pump chambers 7 and fluid diodes 10. The pump chambers 7 and the fluid diodes 10 are alternately arrayed on both sides of the nozzle holes 9, and the ink reservoirs 5 are located being divided in both the right and left sides. This setup enables the nozzle holes 9 to be more densely arrayed.

Although the aforementioned embodiments have dealt with the nozzle heads of the type of multi-nozzles, it should be noted that the present invention is also applicable to the nozzle heads of the type of single nozzle.

What is claimed is:

1. A nozzle head of an ink-jet printing apparatus comprising;
   - a nozzle head consisting of a base plate having pump chambers formed between an ink reservoir and nozzle holes, and grooves for forming fluid diodes between said pump chambers and said ink reservoir, a covering plate joined to said base plate as a unitary structure, and electromechanical converter elements mounted on said base plate at positions corresponding to said pump chambers;
   - means for supplying an ink to said pump chambers via said ink reservoir of said nozzle head; and
   - means for changing the volumes of said pump chambers by way of said electromechanical converter elements of said nozzle head responsive to electric signals.

2. A nozzle head of an ink-jet printing apparatus according to claim 1, wherein the fluid diodes formed between the pump chambers and the ink reservoir are composed of capsular-type purely fluid diodes arrayed at least in one stage.

3. A nozzle head of an ink-jet printing apparatus according to claim 1, wherein a plurality of paths are communicated with a single ink reservoir, each path being made up of a fluid diode, a pump chamber and a nozzle hole.

4. A nozzle head of an ink-jet printing apparatus according to claim 1, wherein the nozzle holes for generating ink particles are formed nearly at right angles with a plane which includes said pump chambers.

5. A nozzle head of an ink-jet printing apparatus according to claim 1, wherein the base plate having grooves for nozzles and the covering plate that will be joined onto said base plate as a unitary structure are made up of a combination of such materials that can be electrostatically coupled together, and said two plates are joined together as a unitary structure by way of electrostatic coupling.

6. A nozzle head of an ink-jet printing apparatus according to claim 2, wherein the base plate and the covering plate have substantially the same thermal expansion coefficient.

7. A nozzle head of an ink-jet printing apparatus according to claim 5, wherein the base plate constituting the nozzle head is made of a semiconductive material, and the covering plate is made of a ceramic material.

8. A nozzle head of an ink-jet printing apparatus according to claim 5, wherein the covering plate of the nozzle head is sandwitched between two pieces of base plates, and the grooves are formed in each of the base plates on both sides of the covering plate.

9. A nozzle head of an ink-jet printing apparatus according to claim 5, wherein the base plate is sandwitched between two pieces of covering plates, and the grooves are formed on both sides of the base plate.

10. A nozzle head of an ink-jet printing apparatus according to claim 2, wherein the base plate is made of a semiconductive material, and the covering plate is made of a borosilicate glass.

11. A nozzle head of an ink-jet printing apparatus according to claim 10, wherein the base plate of the nozzle head is formed in a portion of a single crystal which exhibits different etching rates depending upon the crystalline surfaces, and at least two surfaces of inner walls of grooves in the base plate are constituted by crystalline surfaces having the slowest etching rate.

12. A nozzle head of an ink-jet printing apparatus according to claim 11, wherein said single crystal is a single crystal of silicon, and at least two surfaces of inner walls of grooves in the base plate are made up of planes (111) in parallel with the direction in which the ink particles will be injected.

13. A nozzle head of an ink-jet printing apparatus according to claim 11, wherein said single crystal is a single crystal of germanium, and at least two surfaces of inner walls of grooves in the base plate are made up of planes (111) in parallel with the direction in which the ink particles will be injected.

14. A nozzle head of an ink-jet printing apparatus according to claim 11, wherein the inner walls of ink paths formed in the nozzle head are made up of three surfaces, two surfaces among them are formed of two planes (111) which form a V-shaped groove in the single crystal, and another surface is an inner surface of the covering plate that is joined to the base plate of said single crystal.

* * * * *